US005099561A

United States Patent [19]

[11] Patent Number: 5,099,561

[45] Date of Patent: Mar. 31, 1992

Santiago Lozano

[54] APPARATUS FOR CONNECTING CASINGS

[75] Inventor: D. Arturo Santiago Lozano, Viscaya, Spain

[73] Assignee: Andres Santiago S.A., Spain

[21] Appl. No.: 339,008

[22] Filed: Apr. 17, 1989

[30] Foreign Application Priority Data

May 6, 1988 [ES] Spain .................................. 8801419

[51] Int. Cl.[5] .............................................. B23P 19/02

[52] U.S. Cl. ........................................ 29/237; 29/238; 29/281.1; 269/127; 269/280; 269/281

[58] Field of Search ............. 29/234, 237, 238, 281.1; 269/127, 279–281, 283

[56] References Cited

U.S. PATENT DOCUMENTS

| | | | |
|---|---|---|---|
| 1,094,978 | 4/1914 | Church | 29/237 |
| 2,381,748 | 8/1945 | Howe | 29/237 |
| 2,485,876 | 10/1949 | Guest | 269/281 |
| 2,841,403 | 7/1958 | Klein et al. | 269/281 |
| 3,426,417 | 2/1969 | Austin | 29/237 |
| 3,653,115 | 4/1972 | Perkins | 29/237 |

*Primary Examiner*—J. J. Hartman

*Attorney, Agent, or Firm*—Ostrolenk, Faber, Gerb & Soffen

[57] ABSTRACT

An apparatus for connecting casings together for axially aligning the casings with respect to each other and then forcing the ends of the casings together. The apparatus can be used in places that are hard to get at. The apparatus is simple and effective and the various parts of the apparatus cannot become separated and lost.

12 Claims, 9 Drawing Sheets

APPARATUS FOR CONNECTING CASINGS

BACKGROUND OF THE INVENTION

1. Field of the Invention

The invention relates to an apparatus for connecting casings (such as hoses, pipes, couplings, coupling boxes, or other tubular or annular objects) together by axially aligning the casings with respect to each other and then forcing the ends of the casings together.

2. Description of the Prior Art

Static machines which are functionally similar to the present invention are available. However, such machines are relatively costly, complicated, heavy, and difficult to operate.

SUMMARY OF THE INVENTION

The invention is directed to an apparatus for connecting casings together. The apparatus includes a first subassembly and a second subassembly. The first subassembly includes a holder for holding a first one of the casings in position to be connected to the second casing and for applying an axial force to the first casing to force the first casing toward the second casing. The first subassembly further includes a first support bracket for holding an alignment element for aligning the first casing with respect to the second casing. The second subassembly includes a second support bracket for holding a support element for positioning the second casing with respect to the first casing and for applying an axial force to the second casing to force the second casing toward the first casing. The second subassembly further includes an extension which is connected to the second support bracket for supporting the second support bracket in position with respect to the first support bracket. The apparatus further includes moving means for moving the subassemblies toward each other to connect the casings together.

The invention is also directed to replaceable alignment and support elements for use within the apparatus.

In operation, appropriately sized replaceable support and alignment elements are positioned within the respective support brackets. A casing is then inserted and held within the holder and aligned by the alignment element. Another casing is positioned on the support element. The moving means is then operated to force the axially aligned casings toward each other to connect the casings together.

The apparatus can be used in places that are hard to get at. The apparatus is simple and effective and elements, such as the alignment and support elements, cannot become separated and lost.

Objects and other features of the invention will become apparent from the following detailed description of a preferred embodiment of the invention considered in conjunction with the accompanying drawings.

DETAILED DESCRIPTION OF THE PREFERRED EMBODIMENT

Figure 2:
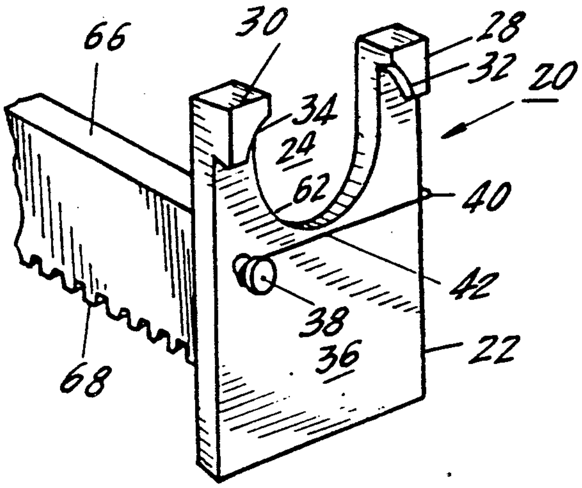
FIG. 2 is a perspective view of a subassembly of the apparatus of FIG. 1.
Figure 3:
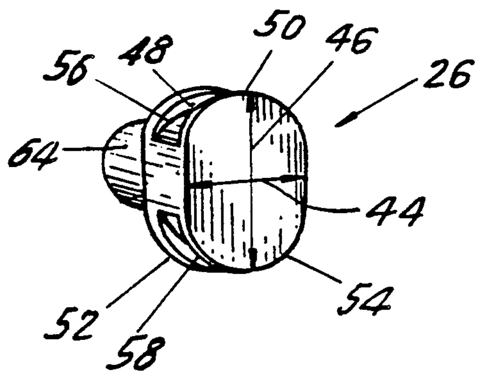
FIG. 3 is a perspective view of a replaceable support element in accordance with the invention.

The preferred embodiment includes a support bracket 20. The support bracket 20 is illustrated in detail in FIG. 2. The support bracket 20 includes a generally rectangular body 22 with a U-shaped cutout section 24 for receiving a replaceable support element 26 (FIG. 3) therein. Ears 28 & 30 are located at the top of the body 22. Each of the ears 28 & 30 has an arcuate lower surface 32, 34 extending axially away from a back face 36 of the body 22. A pin 38 and a groove 40 are located about midway along the back face 36. A spring 42 is stretched between and supported by the pin 38 and groove 40.

The replaceable support element 26 has an oblong cross-section with a dimension 44 being shorter than a dimension 46. The oblong shape is created by two pairs of extending flanges 48, 50, 52, & 54. The flanges 48, 50, 52, & 54 are separated by circular recesses 56 & 58.

Figure 4:
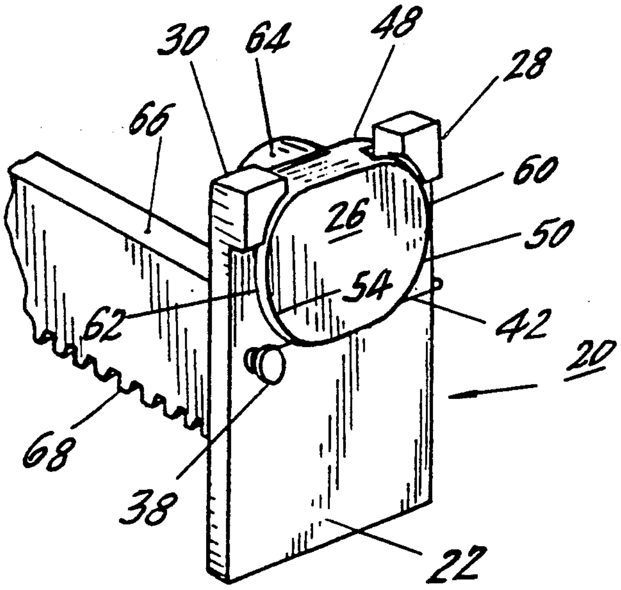
FIG. 4 is a perspective view of the subassembly of FIG. 2—with the replaceable support element of FIG. 3.

The replaceable support element 26 is inserted into the bracket 20 with the dimension 44 perpendicular to the direction of insertion. This way, the element 26 fits between the ears 28 & 30. After the element 26 is inserted past the ears 28 & 30, the element 26 is rotated through 90°. After rotation, as illustrated in FIG. 4, the circular recesses 56 & 58 are adjacent side walls 60 & 62 of the U-shaped cutout section 24. With the circular recesses 56 & 58 adjacent the side walls 60 & 62, the flanges 48, 50, 52, & 54 are on respective sides of the support bracket 20.

As the replaceable support element 26 is inserted into the cutout section 24, the spring 42 is biased downwardly by one of the extending flanges 58 until the element 26 is rotated through 90°. Even after the element 26 is rotated into position, the spring 42 continues to bias the element 26 upwardly against the ears 28 & 30 so that the element 26 is stably held in position within the support bracket 20. As a result, the element 26 will not fall out of the support bracket 20 and become separated or lost.

A mandrel 64 is located on one side of the replaceable support element 26. In operation, an end of a casing (not illustrated) is slipped over the mandrel 64 whereby the casing (not illustrated) is supported in position by the replaceable support element 26. The element 26 can be replaced by another replaceable support element (not illustrated) having a mandrel with a different diameter and/or cross-section to accommodate a different sized or shaped casing (not illustrated).

Figure 1:
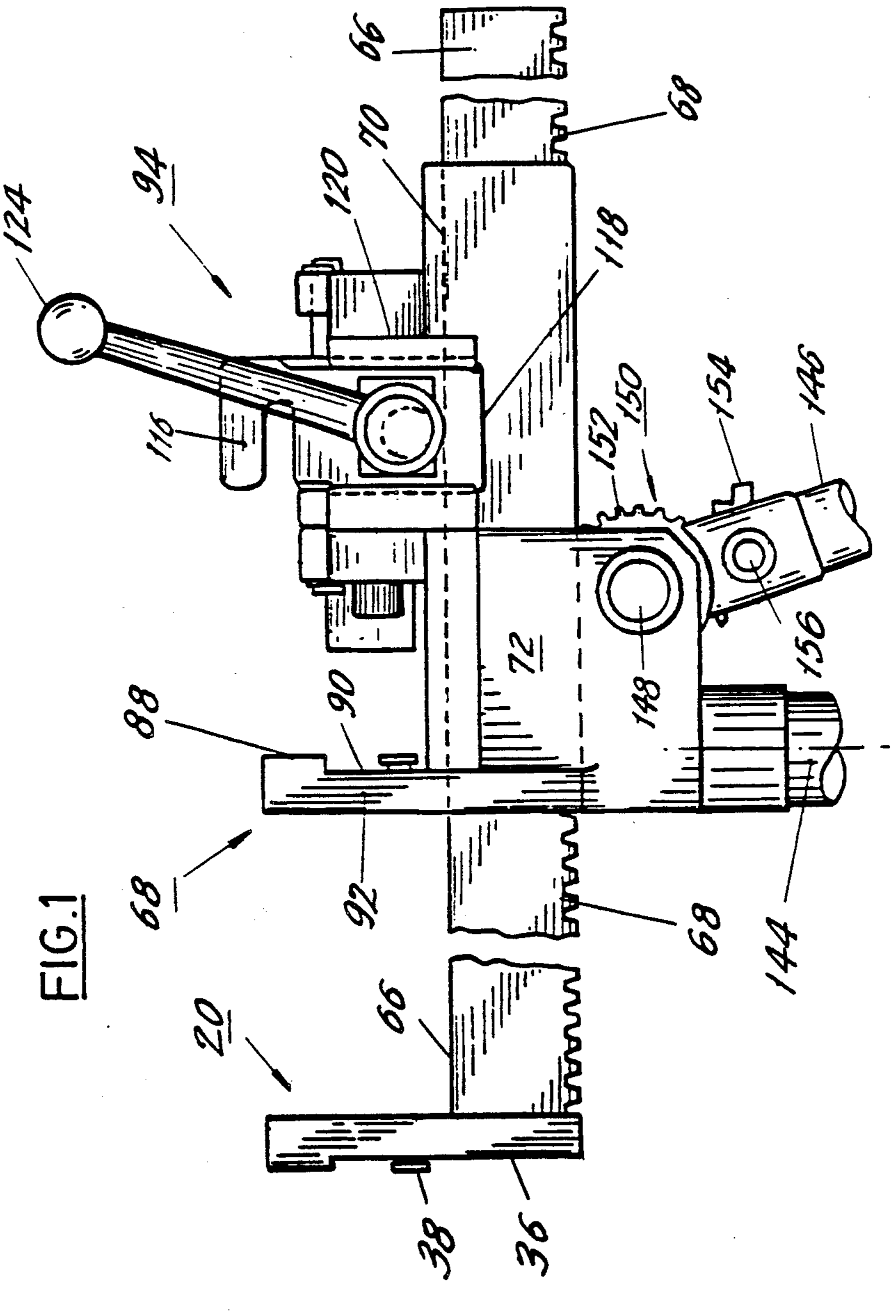
FIG. 1 is a side view of an apparatus in accordance with the invention.

The support bracket 20 extends upwardly from and is rigidly connected to an extension 66 (FIG. 1). The extension 66 in turn supports the support bracket 20 in position with respect to another support bracket 68.

The extension 66 has a rack or tooth section 69 and is slidably movable through a U-shaped hole 70 of a body 72 such that the two brackets 20 & 68 can be moved toward or away from each other. For clarity, portions of the extension 66 are broken away in FIG. 1 and the extension is not included in FIGS. 6–11.

Figure 5:
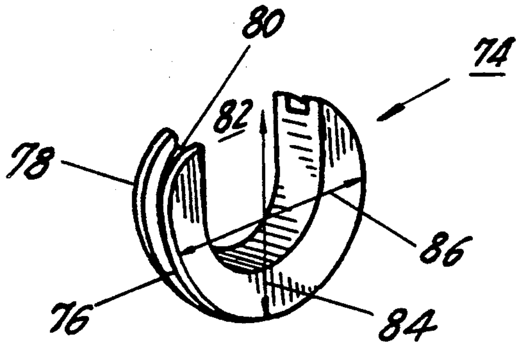
FIG. 5 is a perspective view of a replaceable alignment element in accordance with the invention.
Figure 6:
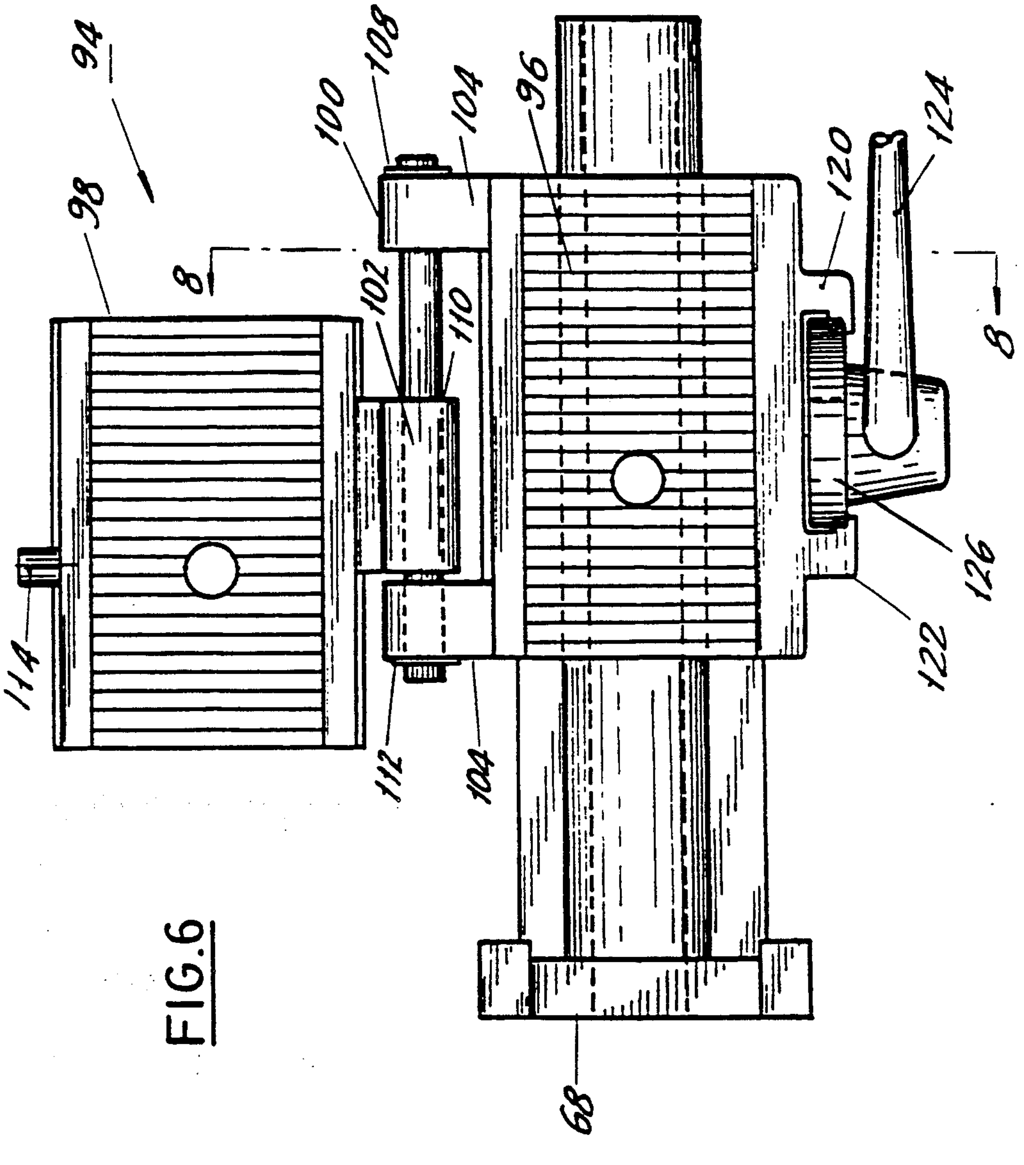
FIG. 6 is a top view of a subassembly of the apparatus of FIG. 1—with a holder open.
Figure 7:
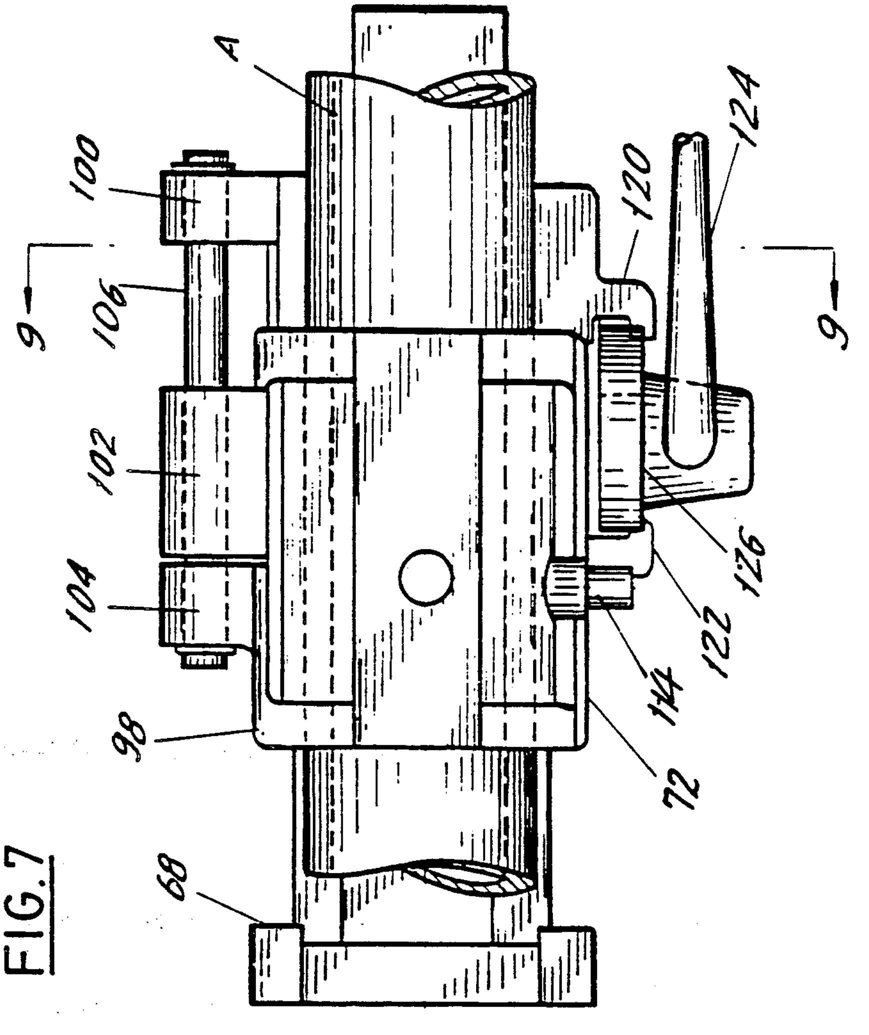
FIG. 7 is a top view of the subassembly of FIG. 6—with the holder closed around a casing.
Figure 8:
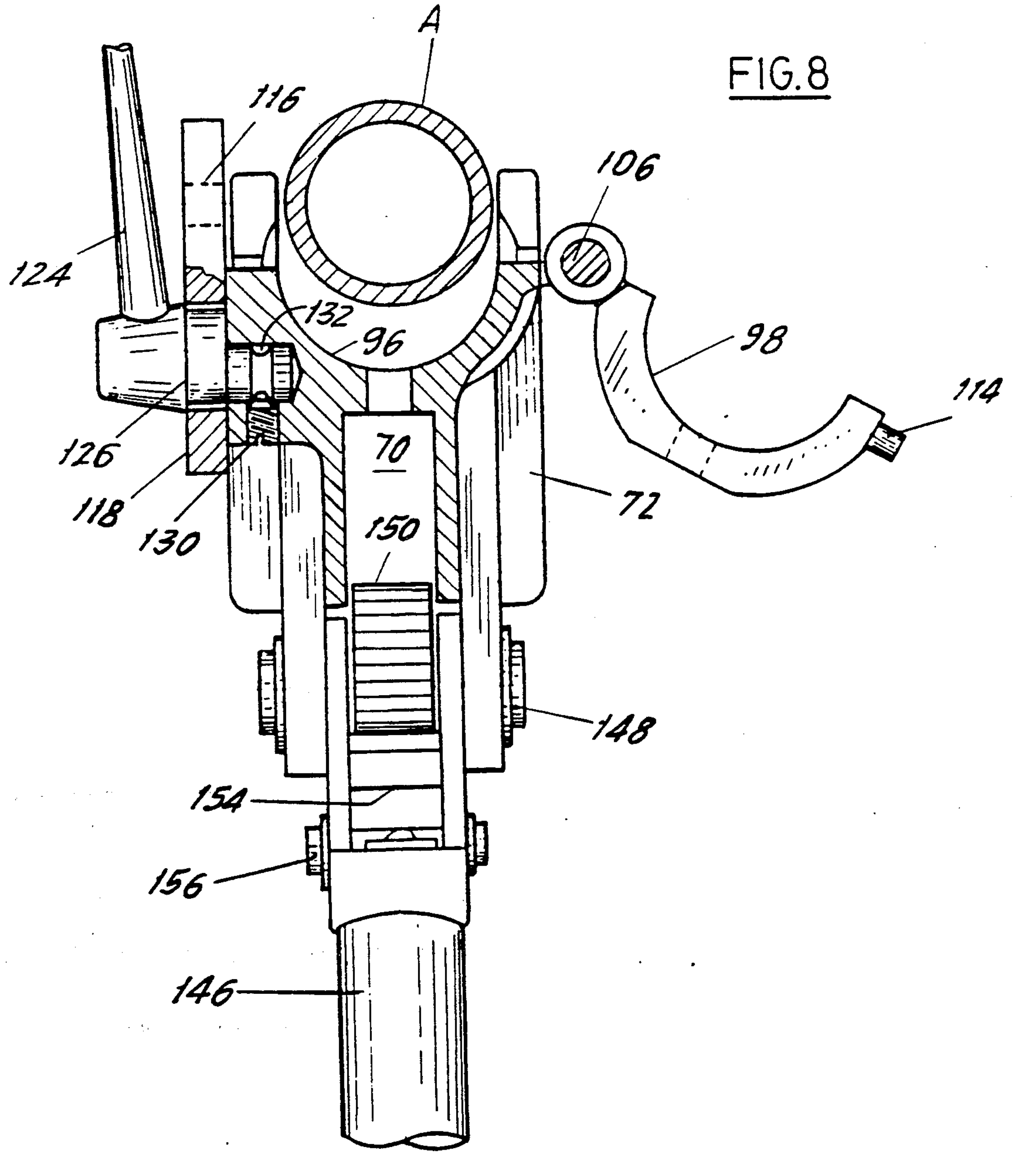
FIG. 8 is a cross-sectional view through the line 8—8 of FIG. 6.
Figure 9:
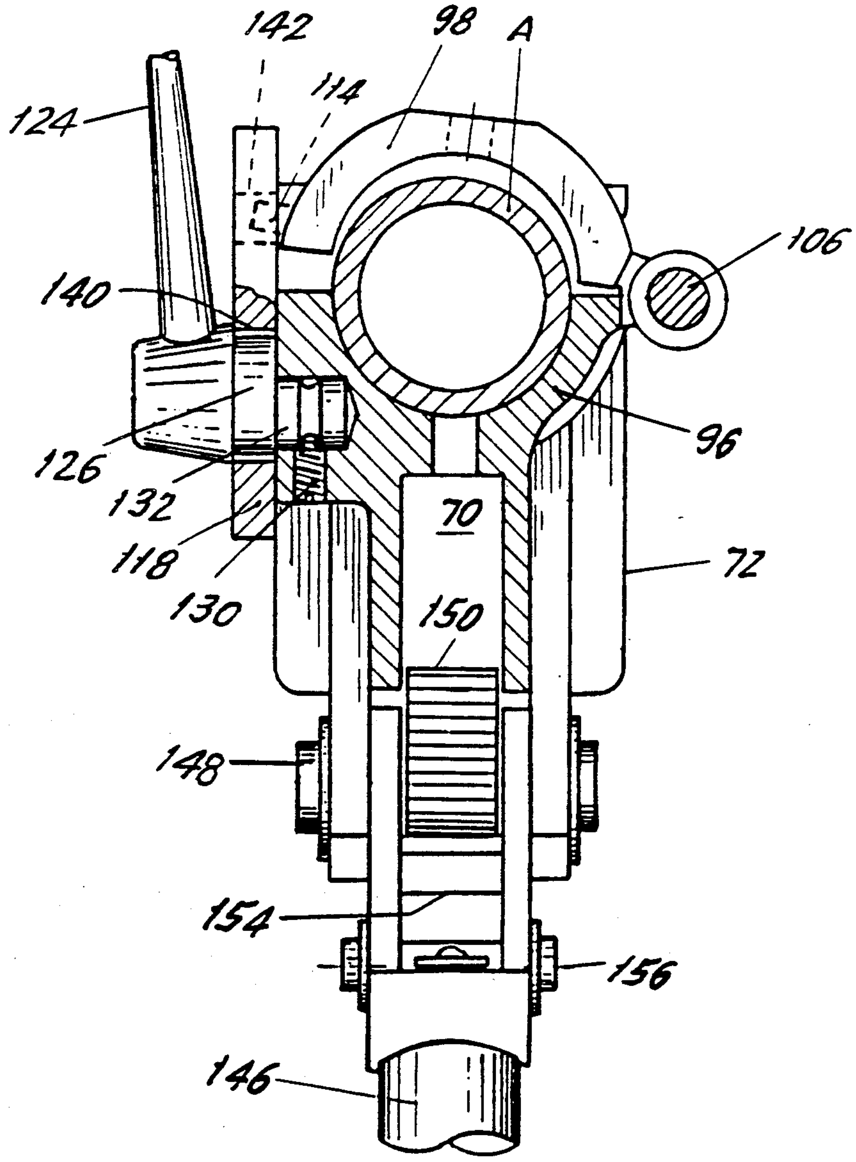
FIG. 9 is a cross-sectional view through the line 9—9 of FIG. 7.

The support bracket 68 is identical to the bracket 20. However, the bracket 68 is used to hold a replaceable alignment element 74 (FIG. 5) for aligning a casing A (FIG. 7) to be connected to the casing (not illustrated) positioned on the mandrel 64 of the support element 26.

The alignment element 74 is comprised of radially extending flanges 76 & 78, a groove 80 located between the flanges 76 & 78, and an opening 82 for receiving the casing A. The replaceable alignment element 74 has an oblong cross-section with a dimension 84 and a dimension 86 which is longer than the dimension 84.

Like the insertion of the support element 26, the alignment element 74 is inserted into the support bracket 68 with the dimension 84 perpendicular to the direction of insertion. Since the dimension 84 is shorter than the dimension 86, the replaceable alignment element 74 fits between the ears 88 of the support bracket 68. After insertion, the element 74 is rotated through 90°. After rotation, the radially extending flanges 76 & 78 are located on opposite sides 90 & 92 of the support bracket 68, the groove 80 is adjacent the interior edges of the bracket 68, and the opening 82 is located at the top of the bracket 68 in position for receiving the casing A for alignment of the casing A. As with the support element 26, the element 74 is held stably in place with one of the flanges 76 biased upwardly against the ears 88 of the support bracket 68 by a spring (not illustrated). Thus, the replaceable alignment element 74 cannot fall out of the support bracket 68 and become separated and lost.

The support bracket 68 is rigidly or fixedly connected to the body 72. A holder 94 is also rigidly connected to the body 72 such that the spacing between the holder 94 and the support bracket 68 remains constant. Details of the holder 94 are illustrated in FIGS. 6–11.

The holder 94 is comprised of a lower element 96 and a corresponding upper element 98. Both of the elements 96 & 98 are C-shaped in cross-section. The elements 96 & 98 are hinged together by a set of ears 100, 102, & 104 and an axial rod 106 which extends through respective holes 108, 110, & 112 through the ears 100, 102, & 104. Thus, the upper element 98 can be rotated in a counterclockwise direction from the open position illustrated in FIG. 8 to the closed position illustrated in FIG. 9.

Figure 10:
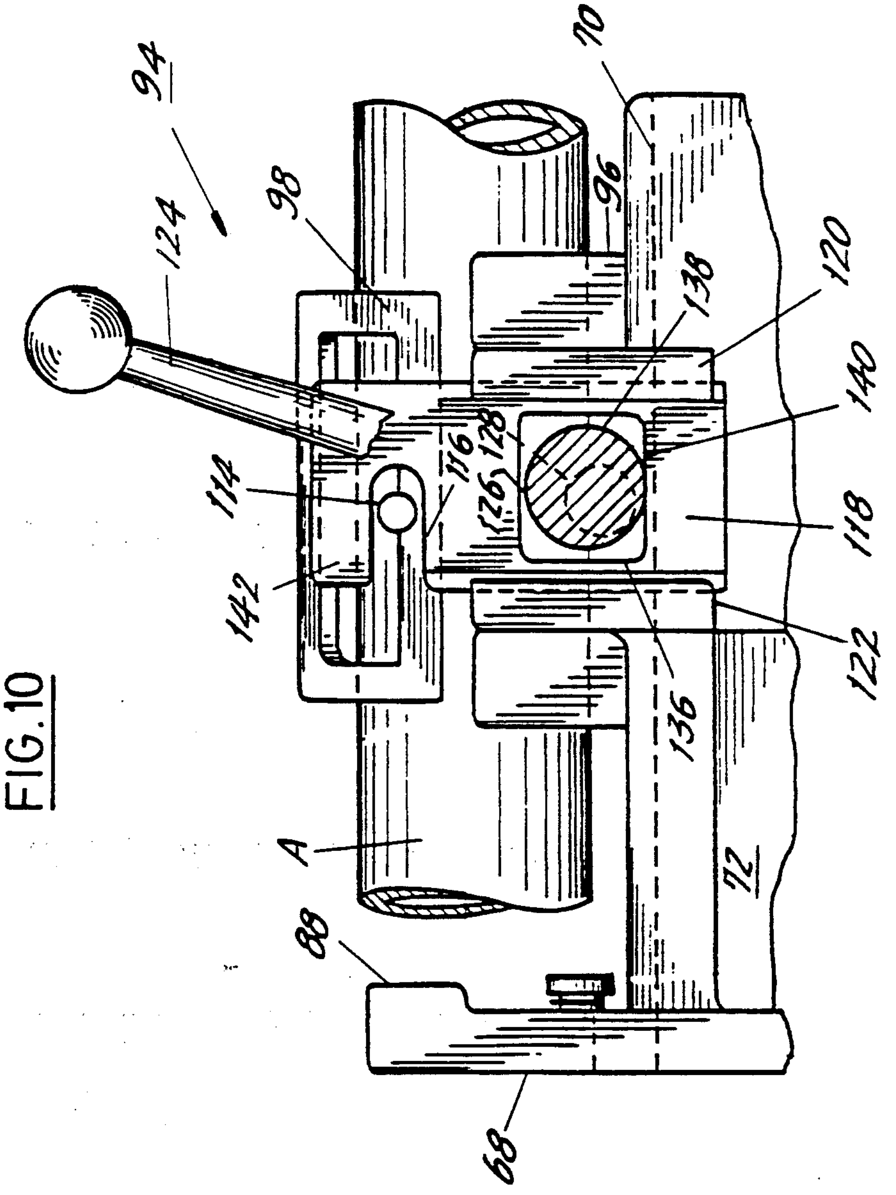
FIG. 10 is a side view of the subassembly of FIG. 6—with the holder partially closed around the casing.
Figure 11:
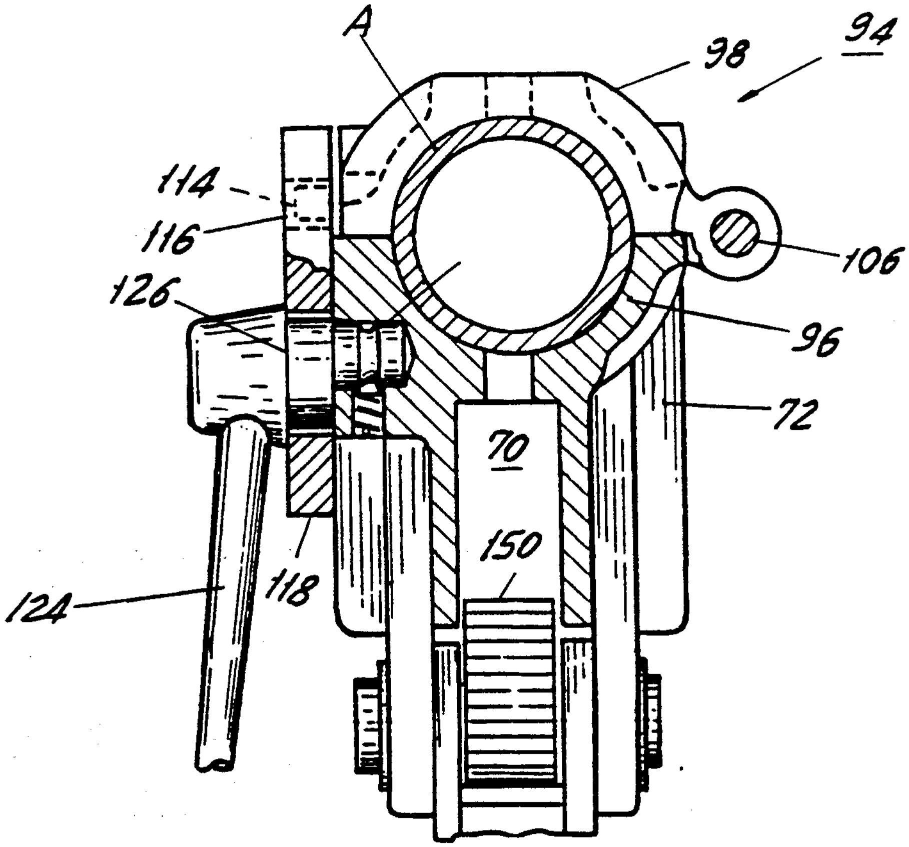
FIG. 11 is a view similar to FIG. 9, but with the holder tightly closed around the casing.

To close the holder 94, the upper element 98 is rotated over the lower element 96 and then slid axially along the rod 106 away from the support bracket 68 until a pin 114 is located within a recess 116 (FIG. 10) of a generally rectangular clamping member 118. The clamping member 118 is vertically slidable between guide elements 120 & 122. The position of the clamping member 118 (and therefore also the position of the recess 116) is determined by the position of a lever 124. The lever 124 is integrally connected to a cam 126 and the cam 126 is in turn integrally connected to an axle 128. The axle 128 is rotatably held in place within the body 72 by a threaded pin 130 (FIG. 8) and an annular groove 132. The cam 126 fits within a rectangular hole 136 (FIG. 10) through the clamping member 118. As illustrated in FIG. 10, when the lever 124 is rotated in a clockwise direction, a cam surface 138 of the cam 126 pushes downwardly against a lower surface 140 of the rectangular hole 136 of the clamping member 118. When the clamping member 118 is forced downwardly by operating the lever 124, the pin 114 is forced downwardly by an upper surface 142 of the recess 116. This pulls the upper element 98 from the partially closed position illustrated in FIG. 9 to the tightly closed position illustrated in FIG. 11. In the tightly closed position, the holder 94 grips the casing A held therewithin and can apply an axial force to the casing A.

A pair of arms 144 & 146 (FIG. 1) extend downwardly from the body 72. The arm 144 is integrally or rigidly attached to the body 72 while the arm 146 is rotatable about an axis 148. The arm 146 includes a sprocket 150 and teeth 152 for engagement with the rack or tooth section 69 of the extension 66. The arm 146 also includes a ratchet element 154 which is rotatable about an axis 156 such that the sprocket 150 and teeth 152 serve as a ratchet to force the extension 66 in a desired direction with respect to the body 72 as the arms 144 & 146 are pumped toward and away from each other. That is, with the ratchet element 154 in a first position, pumping the arms 144 & 146 toward and away from each other forces the casings toward each other. With the ratchet element 154 in a second position, pumping the arms 144 & 146 toward and away from each other moves the support brackets 20 & 68 away from each other.

In operation, appropriately sized replaceable support and alignment elements 26 (FIG. 3) & 74 (FIG. 5) are positioned within the respective support brackets 20 & 68 (FIG. 1). A casing A is then inserted and held within the holder 94 and aligned by the alignment element 74. Another casing (not illustrated) is positioned on and aligned by the mandrel 64 of the element 26. The moving means is then operated to force the axially aligned casings toward each other to connect the casings together. When the support brackets 20 & 68 are forced toward each other, the reaction force of the casing (not illustrated) positioned on the mandrel 64 is resisted by the support element 26. This reaction force is directed through the flanges 48 & 52 and is in turn resisted by the support bracket 20. The reaction force of the other casing A is resisted by the tightly gripping holder 94. The alignment element 74 assists in maintaining the alignment of the casings.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

I claim:

1. An apparatus for connecting casings together, comprising:

(A) a subassembly, including:

(1) a holder for holding a first casing in position for connection to a second casing, said holder having first and second hinged elements for holding said first casing therebetween, said first and second hinged elements each having at least one ear projecting therefrom, and an axial rod extending through said ears, one of said hinged elements being rotatable around and slidable along said axial rod; and (2) an alignment element for aligning said first casing with respect to said second casing, and a first support bracket for holding said alignment element, the alignment element being receivable within the first support bracket, and the first support bracket being connected to the holder;

(B) a second subassembly, including:

(1) a support element for positioning said second casing with respect to said first casing and for applying an axial force to said second casing to force said second casing toward said first casing, and a second support bracket for holding said support element, said support element being receivable within said second support bracket; and (2) an extension slidably received at one end in said first subassembly and connected at another end to said second support bracket for supporting said second support bracket in position with respect to said first subassembly, wherein said extension includes a tooth section for slidably extending said extension through said first assembly; and (C) moving means for moving said second subassembly toward said first subassembly to connect said first casing and said second casing together, said moving means including a pair of arms, a first one of said arms being rigidly connected to said holder, a second one of said arms being rotatable with respect to said first one of said arms, said second one of said arms having a sprocket and a ratchet element for cooperation with said tooth section to selectively (i) move said support brackets away from each other and (ii) force the casings toward each other.

2. The apparatus of claim 1, wherein said holder comprises:

tightening means connected to said hinged elements for closing said hinged elements tightly together.

3. The apparatus of claim 2, wherein said hinged elements comprise an upper element and a lower element, said upper and lower elements each being C-shaped in cross-section and together in a closed position define an enclosure for holding said first casing.

4. The apparatus of claim 2 wherein said tightening means includes:

(a) a pin connected to one of said hinged elements; and (b) can-operated means for pulling said pin to close said hinged elements tightly together.

5. The apparatus of claim 4, wherein said holder comprises:

(a) a vertically movable element having a cam surface therein;

(b) guides associated with said vertically movable element for guiding said vertically movable element;

(c) a rotatable cam for cooperating with said cam surface; and (d) a lever connected to said cam for rotating said cam against said cam surface to move said vertically movable element downwardly to pull said pin and close said hinged elements tightly together.

6. The apparatus of claim 1, wherein said alignment element is removable from said first support bracket and said support element is removable from said second support bracket.

7. The apparatus of claim 1, wherein said first support bracket includes:

a cutout section for removably receiving said alignment element;

said alignment element comprises a portion having a periphery for being received in said cutout section wherein said portion has different widths in different directions across said portion such that with said portion at one rotative orientation with respect to said cutout section, said periphery of said portion locks said alignment element in said cutout section, and with said portion at another rotative orientation with respect to said cutout section, said periphery of said portion permits removal from and insertion into said cutout section of said portion.

8. The apparatus of claim 7, further comprising means at said first support bracket for holding said alignment element at a selected rotative orientation with respect to said cutout section.

9. The apparatus of claim 1, wherein said first support bracket includes:

(a) a first U-shaped cutout section for removably receiving said alignment element;

(b) ears at the top of said section; and (c) a spring for biasing said alignment element toward said ears to stably hold said alignment element between said spring and said ears and at a selected relative orientation with respect to said cutout section; and said alignment element comprises a portion having a periphery for being received in said cutout section wherein said portion has different widths in different directions across said portion such that with said portion at one rotative orientation with respect to said cutout section, said periphery of said portion locks said alignment element in said cutout section, and with said portion at another rotative orientation with respect to said cutout section, said periphery of said portion permits removal from and insertion into said cutout section of said portion.

10. The apparatus of claim 9, wherein said second support bracket includes:

(a) a second U-shaped cutout section for replaceably receiving said support element;

(b) ears at the top of said second section; and (c) a spring for biasing said support element toward said ears of said second support bracket to stably hold said support element between said spring of said second support bracket and said ears of said second support bracket.

11. The apparatus of claim 1, wherein said second support bracket includes a cutout section for removably receiving said support element;

said support element comprises a portion having a periphery for being received in said cutout section wherein said portion has different widths in different directions across said portion such that with said portion at one rotative orientation with respect to said cutout section, said periphery of said portion locks said support element in said cutout section, and with said portion at another rotative orientation with respect to said cutout section, said periphery of said portion permits removal from and insertion into said cutout section of said portion.

12. The apparatus of claim 11, further comprising means at said second support bracket for holding said support element at a selected rotative orientation with respect to said cutout section.

* * * * *